United States Patent
Seo et al.

(10) Patent No.: US 11,189,236 B2
(45) Date of Patent: Nov. 30, 2021

(54) POWER STABILIZATION CIRCUIT WHICH CANCELS NOISE OF RELAY AND DISPLAY DEVICE TO WHICH SAME IS APPLIED

(71) Applicant: SAMSUNG ELECTRONICS CO., LTD., Suwon-si (KR)

(72) Inventors: Kang Moon Seo, Seoul (KR); Young Soo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 16/486,889

(22) PCT Filed: Feb. 21, 2018

(86) PCT No.: PCT/KR2018/002139
§ 371 (c)(1),
(2) Date: Aug. 19, 2019

(87) PCT Pub. No.: WO2018/186587
PCT Pub. Date: Oct. 11, 2018

(65) Prior Publication Data
US 2020/0234656 A1    Jul. 23, 2020

(30) Foreign Application Priority Data
Apr. 4, 2017   (KR) .................. 10-2017-0043517

(51) Int. Cl.
| G06F 1/26 | (2006.01) |
| G09G 3/34 | (2006.01) |
| H02M 1/32 | (2007.01) |

(52) U.S. Cl.
CPC .......... G09G 3/3406 (2013.01); G06F 1/266 (2013.01); H02M 1/32 (2013.01); *G09G 2330/02* (2013.01)

(58) Field of Classification Search
CPC .. G09G 3/3406; G09G 2330/02; G06F 1/266; H02M 1/32
See application file for complete search history.

(56) References Cited

U.S. PATENT DOCUMENTS 5,754,419 A * 5/1998 Ho ........................ H02M 3/158
                                                           363/89
5,923,520 A    7/1999 Ikeda et al.
(Continued)

FOREIGN PATENT DOCUMENTS

| JP | 09-322184 | 12/1997 |
| JP | 11-191964 | 7/1999 |

(Continued)

OTHER PUBLICATIONS

International Search Report for PCT/KR2018/002139 dated Jun. 4, 2018, 4 pages.

(Continued)

*Primary Examiner* — Aurel Prifti
(74) *Attorney, Agent, or Firm* — Nixon & Vanderhye, P.C.

(57) ABSTRACT

Disclosed are a power stabilization circuit and a display device to which the power stabilization circuit is applied. The power stabilization circuit includes a thermistor provided on a first path through which an input power is supplied, to limit an inrush current of the power, a relay that provides a second path through which the power is supplied without passing through the thermistor, to allow the power to be transferred through the second path instead of the first path when a current is supplied, and a switching circuit that is switched to supply the current generated from the input power to the relay when an activation signal for activating at least one of a display and a backlight of the display is received.

13 Claims, 8 Drawing Sheets

(56) References Cited

U.S. PATENT DOCUMENTS

| | | | | |
|---|---|---|---|---|
| 6,151,016 A * | 11/2000 | Kanbe | ............... | G09G 3/3648 345/204 |
| 7,291,987 B2 | 11/2007 | Chang et al. | | |
| 8,164,587 B2 * | 4/2012 | Chang | ............... | H02M 5/4585 345/211 |
| 8,947,343 B2 * | 2/2015 | Kim | ............... | G09G 3/342 345/102 |
| 2006/0279519 A1 | 12/2006 | Wang | ............... | G09G 5/006 345/102 |
| 2007/0018593 A1* | 1/2007 | Kuo | ............... | H05B 41/2822 315/312 |
| 2007/0126369 A1* | 6/2007 | Meng | ............... | H05B 41/245 315/282 |
| 2008/0247105 A1* | 10/2008 | Divan | ............... | H02H 9/04 361/56 |
| 2010/0132385 A1* | 6/2010 | Yoo | ............... | H02M 1/32 62/115 |
| 2011/0314308 A1* | 12/2011 | Tajima | ............... | H01L 27/0285 713/300 |
| 2012/0106020 A1* | 5/2012 | Huo | ............... | H01H 47/325 361/152 |
| 2012/0280637 A1* | 11/2012 | Tikkanen | ............... | H05B 47/175 315/294 |
| 2013/0015781 A1* | 1/2013 | Kanemitsu | ............... | H05B 45/50 315/291 |
| 2013/0147361 A1* | 6/2013 | Kang | ............... | H05B 47/23 315/122 |
| 2013/0147433 A1* | 6/2013 | Chen | ............... | H02J 7/0077 320/112 |
| 2014/0043314 A1* | 2/2014 | Park | ............... | G06F 3/038 345/212 |
| 2014/0084792 A1* | 3/2014 | Oh | ............... | G09G 3/00 315/120 |
| 2014/0192102 A1* | 7/2014 | Im | ............... | H05B 45/46 345/691 |
| 2015/0042925 A1* | 2/2015 | Hu | ............... | H05B 45/50 349/69 |
| 2015/0049520 A1* | 2/2015 | Xu | ............... | H02M 1/32 363/21.02 |
| 2015/0116302 A1* | 4/2015 | Kim | ............... | G09G 3/3225 345/212 |
| 2015/0382430 A1* | 12/2015 | Lee | ............... | H05B 45/3725 315/121 |
| 2016/0380571 A1* | 12/2016 | Yoshida | ............... | H02H 7/1216 318/504 |
| 2017/0053588 A1* | 2/2017 | Lim | ............... | G09G 3/3275 |
| 2017/0141678 A1* | 5/2017 | Liu | ............... | H02M 7/06 |
| 2017/0353115 A1* | 12/2017 | Kim | ............... | H02M 1/36 |
| 2019/0214852 A1* | 7/2019 | Park | ............... | H02J 7/02 |
| 2020/0015026 A1* | 1/2020 | Kataoka | ............... | H04R 29/001 |

FOREIGN PATENT DOCUMENTS

| | | |
|---|---|---|
| JP | 2002-218489 | 8/2002 |
| JP | 2002-330538 | 11/2002 |
| JP | 2006-094580 | 4/2006 |
| KR | 10-0226320 | 10/1999 |
| KR | 10-2000-0075153 | 12/2000 |
| KR | 10-2006-0132465 | 12/2006 |
| KR | 10-1397765 | 5/2014 |
| KR | 10-2016-0141526 | 12/2016 |

OTHER PUBLICATIONS

Written Opinion of the ISA for PCT/KR2018/002139 dated Jun. 4, 2018, 8 pages.
Notice of Preliminary Rejection dated Mar. 25, 2021 in counterpart Korean Patent Application No. 10-2017-0043517 and English-language translation.

* cited by examiner

POWER STABILIZATION CIRCUIT WHICH CANCELS NOISE OF RELAY AND DISPLAY DEVICE TO WHICH SAME IS APPLIED

This application is the U.S. national phase of International Application No. PCT/KR2018/002139 filed Feb. 21, 2018 which designated the U.S. and claims priority to KR Patent Application No. 10-2017-0043517 filed Apr. 4, 2017, the entire contents of each of which are hereby incorporated by reference.

BACKGROUND

1. Field

Embodiments disclosed herein relate to a power stabilization circuit capable of stabilizing an input power and a display device to which the power stabilization circuit is applied. 2. Description of Related Art A display device using an alternating current (AC) power source has used a thermistor to limit an inrush current occurring at the time of power-on. For example, the display device may supply, to a load, a power in which the inrush current is limited through the thermistor during the power-on (in the case where the inrush current occurs).

However, the thermistor generates heat upon continuous use, and therefore, the display device may use a relay that provides a path that does not pass through the thermistor. For example, the display device may supply a power to the load through the relay without passing through the thermistor after the power-on (when the inrush current does not occur).

SUMMARY

The display device may use a first signal generated in a power-on process of the display device as an on/off control signal of the relay. The first signal may be, for example, a signal for activating a power supply module outputting a driving voltage of a display device.

The display device may be powered on to display a screen according to operation of a power-on switch provided in a remote control device or a housing. The display device may be powered on in other manners when performing an over the network (OTN) function, an Internet of things (IOT) function or the like. For example, the display device may be powered on, for example, at a scheduled time when performing the OTN function, to receive and update firmware from a server over a network. As another example, the display device may be powered on at the request of a user terminal to provide other additional functions such as music playback in a screen-off state, as an example of the IOT operation.

The display device controls the relay in synchronization with the power on/off time points, so that the relay may be turned on/off each time when being powered on/off. The relay may cause noise during movement of contacts (on or off), which may be annoying to any user or at any time of day. Moreover, the firmware update is performed mainly at the early morning hours, and the power-on due to the IOT function may be performed more frequently than the power-on through the operation of the power switch, so that the relay noise may become more problematic.

Embodiments disclosed herein may provide a power stabilization circuit and a display device to which the power stabilization circuit is applied, capable of improving a user's discomfort due to emotional noises of a relay.

A power stabilization circuit according to an embodiment includes a thermistor provided on a first path through which an input power is supplied, to limit an inrush current of the power, a relay that provides a second path through which the power is supplied without passing through the thermistor, to allow the power to be transferred through the second path instead of the first path when a current is supplied, and a switching circuit that is switched to supply the current generated from the input power to the relay when an activation signal for activating at least one of a display and a backlight of the display is received.

Further a display device according to an embodiment includes the power stabilization circuit of claim 1, and further includes at least one of the display and the backlight of the display activated by the activation signal.

A power stabilization method, according to an embodiment includes limiting an inrush current of an input power through a thermistor provided on a first path through which the input power is supplied, switching a switching circuit to output a first driving voltage generated from the input power when an activation signal for activating at least one of a display and a backlight of the display is received, and supplying the first driving voltage transferred through the switching circuit to a relay providing a second path on which the input power does not pass through the thermistor to allow the input power to be supplied through the second path.

DETAILED DESCRIPTION

Figure 1:
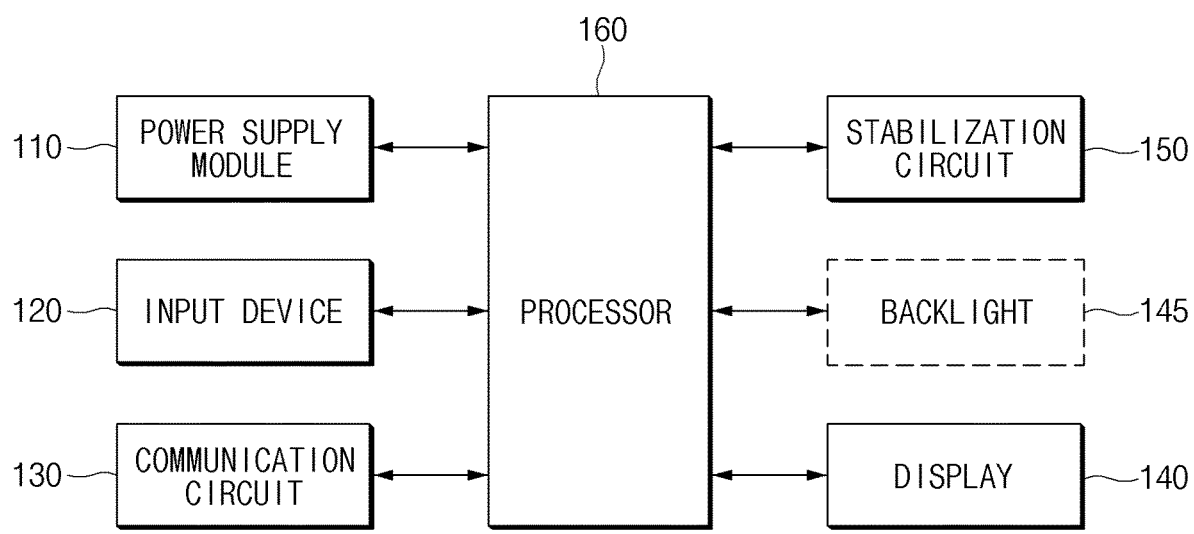
FIG. 1 is a configuration diagram illustrating a display device according to an embodiment of the disclosure.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

FIG. 1 is a configuration diagram illustrating a display device according to an embodiment of the disclosure.

Referring to FIG. 1, according to an embodiment, a display device 10 may include a power supply module (e.g., a power conversion circuit) 110, an input device 120, a communication circuit 130, a display 140, a processor 160 and a stabilization circuit 150. In one embodiment, some components may be omitted, or additional components may be further included. Alternatively, in one embodiment, some of the components may be combined to form a single entity, but functions of the some components prior to the combination may be performed in the same manner. The input/output relationship shown in FIG. 1 is merely an example for convenience of description, and may not be limited thereto.

The display device 10 may include at least one of, for example, a TV, a monitor, a notebook, a large format display (LFD), a smartphone, a tablet personal computer, a mobile phone, a video telephone, an e-book reader, a desktop personal computer, a laptop personal computer, a netbook computer, a personal digital assistant (PDA), a portable multimedia player (PMP), and an electronic frame.

According to one embodiment, the display device 10 may be driven in first to third modes. The first mode (e.g., standby mode) may be a mode in which the booting block is in a driving or standby state and the other blocks are turned off. The booting block may be a component for detecting a power-on time point of the display device 10. The booting block may include at least one of, for example, the input device 120 or the communication circuit 130 that detects a time point at which the power-on is requested, or a timer of the processor 160 that detects a time point at which the power-on is scheduled, and the like. The second mode (e.g., semi standby mode) may be a mode in which a sub-function that does not use the display 140 is executed. In the second mode, a component (e.g., the communication circuit) corresponding to the sub-function to be executed except for the display 140 may be executed. The third mode (e.g., active mode) may be a mode in which a main function using the display 140 is executed. In the third mode, a component corresponding to the main function including the display 140 may be executed. Thus, the display 140 may be in the active (or turned-on) state in the third mode and in the inactive (or turned-off) state in the other modes.

According to one embodiment, when an AC power (for example, 220 V) is supplied, the power supply module 110 may include an AC-DC conversion circuit that converts and outputs the AC power into a DC power of a specified magnitude (e.g., a first driving voltage). The AC-DC conversion circuit may be driven to output the DC power when the AC power is applied, regardless of an operation mode of the display device 10. In the disclosure, the description is given as taking, as an example, the case where the power supply module 110 receives the AC power, but the disclosure is not limited thereto. For example, when the power supply module 110 receives the DC power, the power supply module 110 may output a DC power of a specified magnitude by boosting or bucking the DC power.

According to one embodiment, the power supply module 110 may include a plurality of sub-blocks each outputting at least one driving voltage in the first to third modes. For example, one sub-block of the power supply module 110 may output a driving voltage (a first driving voltage) of a booting block in a first mode (e.g., standby mode). In another example, when receiving a first signal generated in a power-on process, another sub-block of the power supply module 110 may output a driving voltage (second driving voltage) of a sub-block which is driven in the second mode. The first signal may be a signal output from the booting block or the processor 160 at a requested time or a scheduled time, and may be a signal for activation of a second driving voltage. In still another example, when receiving, from the processor 160, a second signal for activation of at least one of a display and a backlight of the display, the another sub-block of the power supply module 110 may output a driving voltage (third drive voltage) of a main block which is driven in the third mode.

According to one embodiment, the input device 120 may detect or receive a user input. For example, the input device 120 may include at least one of an input button (e.g., a power-on switch) provided in the display device or a communication unit for communicating with a remote control device (e.g., a remote control). In one embodiment, the input device 120 may detect or receive a signal corresponding to operation of the power-on switch or a power-on request via the remote control device. The input device 120 may be driven in at least one of the first to third modes.

According to one embodiment, the communication circuit 130 may communicate with an external device (e.g., an external electronic device or an external server) through a communication network. The communication network may be, for example, LAN, FTTH, xDSL, WiFi, Wibro, 3G or 4G. The external electronic device may include a user terminal such as a smart phone, for example. The external server may include, for example, a manufacturer server that provides the driving firmware of the display device 10. In one embodiment, the communication circuit 130 may detect or receive a signal corresponding to the power-on request through an external server or a user terminal. The communication circuit 130 may be driven in at least one of the first to third modes.

The display 140 may include, for example, a liquid crystal display (LCD), a light emitting diode (LED) display, and an organic light emitting diode (OLED) display. When the display 140 is a liquid crystal display, the display device 10 may further include a backlight of the display (e.g., 145 of FIG. 2). The display 140 may display various content (e.g., text, images, video, icons, and/or symbols) to a user, for example. According to one embodiment, the display 140 may be operated in the third mode in which a main function is executed.

The processor 160 may include at least one of, for example, a central processing unit (CPU), a graphics processing unit (GPU), a microprocessor, an application processor, an application specific integrated circuit (ASIC), and field programmable gate arrays (FPGA), and may have a plurality of cores. The processor 160 may perform operations and data processing relating to control and/or communication for at least one of other components of the display device 10. According to one embodiment, the processor 160 may be in a power-off state in the first mode. Alternatively, when the booting block is included in the processor 160, the processor 160 may be in a standby state in which only some of the blocks, which identify the requested time point or the scheduled time point in the first mode, are driven.

According to one embodiment, the processor 160 or the booting block may detect the requested time point or the scheduled time point in the first mode. The requested time point may be, for example, a time point at which the turning-on operation of the power switch is detected. The requested time point may be at least one of time points at which a power-on request from, for example, the remote control device (e.g., a remote control or a smart phone) is detected through the input device 120 or the communication circuit 130. The scheduled time point may be a time point recorded on a memory (not shown) of the display device 10.

According to one embodiment, the processor 160 or the booting block may output a first signal at the requested time point or the scheduled time point. The processor 160 may be booted to be driven in the second mode after the first signal is output. The first signal may be a signal for activating a component that performs a specified function in the second mode. For example, the first signal is a signal that instructs the power supply module 110 to output a driving voltage (a second driving voltage) for a component including the processor 160 that performs a function corresponding to the second mode.

In one embodiment, the processor 160 may perform a sub-function (e.g., an Internet of things (IOT) function or a firmware update function) requested or scheduled in the second mode. For example, the processor 160 may execute a music playback function requested via the communication circuit 130 using an audio output device (not shown) (e.g., a speaker, amplifier, or the like). As another example, the processor 160 may update the firmware using a memory (not shown) or the like in accordance with an instruction from an external server.

According to one embodiment, the processor 160 may be switched to the third mode by outputting a second signal to perform the main function using the display 140. The second signal may be a signal (a second activation signal) for activating at least one of the display and the backlight of the display (e.g., 145 of FIG. 2). For example, the second signal may be a signal for instructing the power supply module 110 to output the driving voltage (third driving voltage) of the display 140. In one embodiment, processor 160 may perform a main function of outputting a received or specified screen via the display 140 in the third mode.

According to one embodiment, the stabilization circuit 150 may be provided on a path through which an input power is supplied. The stabilization circuit 150 may limit the inrush current generated upon the initial supply of the input power (the first mode). For example, the stabilization circuit 150 may limit the initial inrush current of the input power via the thermistor as the input power is supplied to a load via the thermistor in the first mode. In one embodiment, when the stabilization circuit 150 may supply the input power to the load via a relay through control of the contacts of the relay when a second signal for activating at least one of the display and the backlight is received. As described above, in the embodiment, the problem that the noise of the relay causes inconvenience to the user may be improved by turning on the relay in a state in which the display is activated. In one embodiment, the processor 160 uses signals for controlling at least one of the display and the backlight to improve the noise problem of the relay, thereby reducing the degree of hardware change and achieving application without software change.

According to one embodiment, the processor 160 may temporarily deactivate and again activate the display 140 so as to allow an unstable screen not to be displayed during display transition (e.g., channel change) after activating at least one of the display 140 and a backlight 145. For example, the processor 160 may temporarily turn off the backlight of the display which has been turned on during the channel change, and then turn it back on (hereinafter referred to as "screen mute"). In this process, the second signal may be temporarily subjected to a state transition (e.g., high→low→high). In one embodiment, it is possible to prevent the contact change of the relay during the two temporary state transitions of the second signal. For example, the stabilization circuit 150 may further include a filter (see F1 in FIG. 2) to cancel the two state transitions of the second signal for the screen mute by a filter F1. The stabilization circuit 150 will be described later with reference to FIGS. 2 to 4.

According to one embodiment, the display device 10 may further include an audio output device (not shown) for outputting sound. In the above-described embodiment, the case where the stabilization circuit 150 controls the contacts of the relay in synchronization with the second signal for activating the display 140 has been described as an example. Alternatively, however, the stabilization circuit 150 may control the contacts of the relay when receiving a third signal for activating the sound output device (not shown) instead of or together with the second signal.

In the above-described embodiment, the case where the processor 160 outputs the first signal has been described as an example. However, the first signal may be output by the booting block. For example, when it is determined that a scheduled time point or a requested time point is reached, the booting block may output the first signal. In this case, the processor 160 may be booted when the first signal is received.

Figure 2:
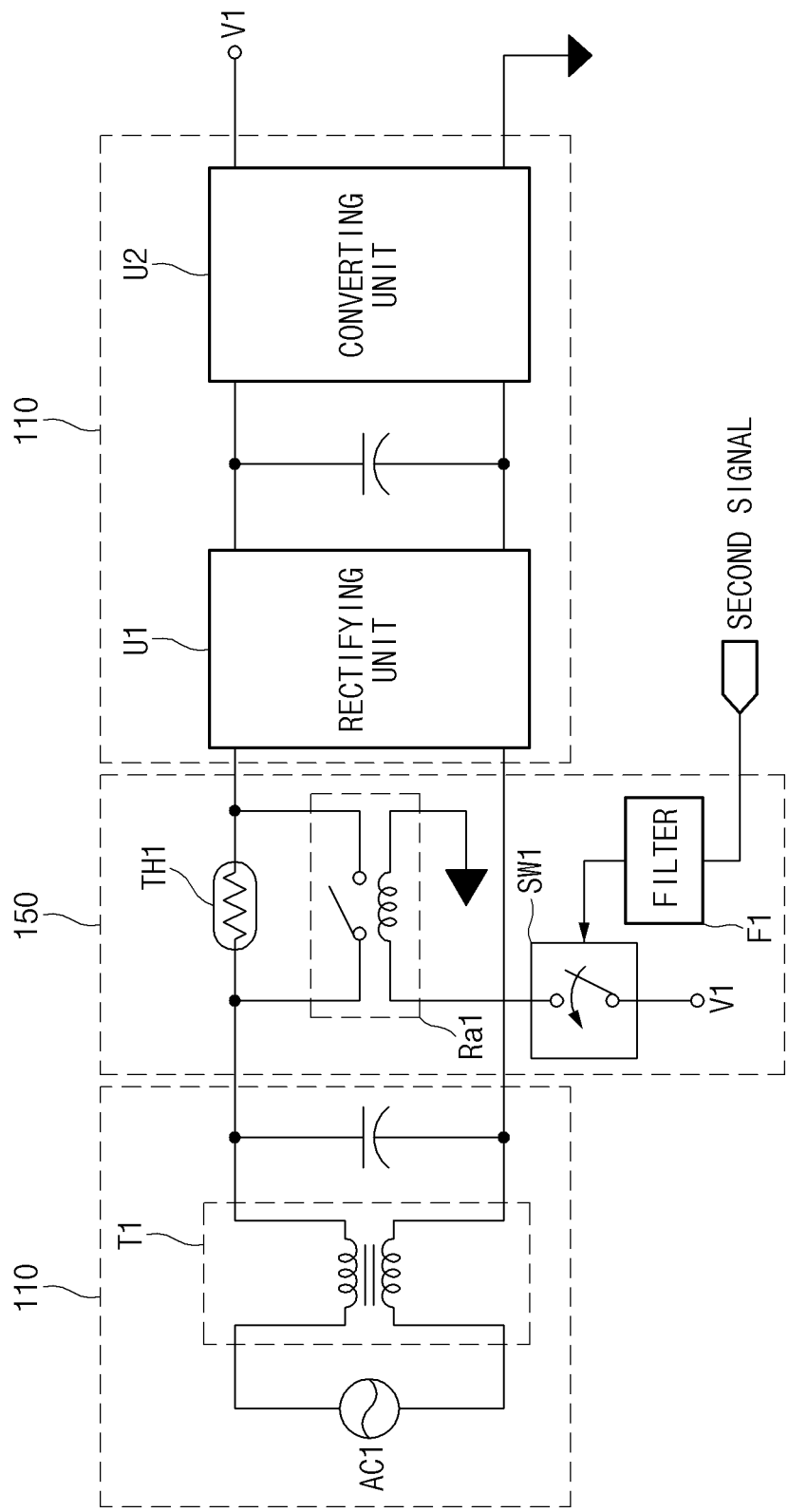
FIG. 2 is a circuit diagram of a power supply module and a stabilization circuit of a display device according to an embodiment of the disclosure.

FIG. 2 is a circuit diagram of a power supply module and a stabilization circuit of a display device according to an embodiment of the disclosure.

Referring to FIG. 2, according to one embodiment, the power supply module 110 may provide an input power passed through the stabilization circuit 150 to other components. Although the first driving voltage V1 is shown as an example only for convenience of description in FIG. 2, the power supply module 110 may output a driving voltage (second or third driving voltage, or the like) other than the first driving voltage V1.

According to one embodiment, the power supply module 110 may include a line filter T1, a rectifying unit (e.g., rectifying circuit) U1, a converting unit U2, and the like. The line filter T1 may remove the noise of an AC power applied through a power supply line. The rectifying unit U1 may be a component for converting the AC power into a DC power. The rectifying unit U1 may convert the AC power through the line filter T1 into the DC power. For example, the rectifying unit U1 may include a bridge rectifying circuit. The converting unit U2 may bypass or scale and output the DC power from the rectifying unit U1 according to a control signal (e.g., a first signal or a second signal) from the processor 160. For example, the converting unit U2 may include a DC-DC converter, a regulator, and the like.

According to one embodiment, the stabilization circuit 150 may be provided on the supply path of the AC power of the power supply module 110, for example, between the line filter T1 and the rectifying unit U1. The stabilization circuit 150 may limit the initial inrush current of the input power via the thermistor and prevent the thermistor from generating heat through the relay.

According to one embodiment, the stabilization circuit 150 may include a thermistor TH1, a relay Ra1, a switching circuit SW1, and the filter F1. The thermistor TH1 may be provided on a first path through which an input power is supplied, for example, the first path between the line filter T1 and the rectifying unit U1 to limit the initial inrush current of the input power supplied through the first path. The relay Ra1 may include a switch for connecting the input and the output of the thermistor and a coil for controlling a contact of the switch. The switch may be connected in parallel to the thermistor TH1 to provide a second path through which the input power is supplied to a load (e.g., a rectifying unit) without passing through the thermistor TH1. The relay Ra1 may control the contact of the switch such that the input power passes through the second path instead of the first path when a current is supplied to the coil. When the switching circuit SW1 receives the second signal via the filter F1, the switching circuit SW1 may be short-circuited or opened to supply or not to supply a current to the coil of the relay Ra1. The second signal may be a signal for activating a display or the display and a backlight. The filter F1 may cancel the state transition of the second signal when the two state transitions of the second signal are made within a specified threshold time. For example, the filter F1 may include an RC filter that delays the second signal by a specified time.

Figure 3:
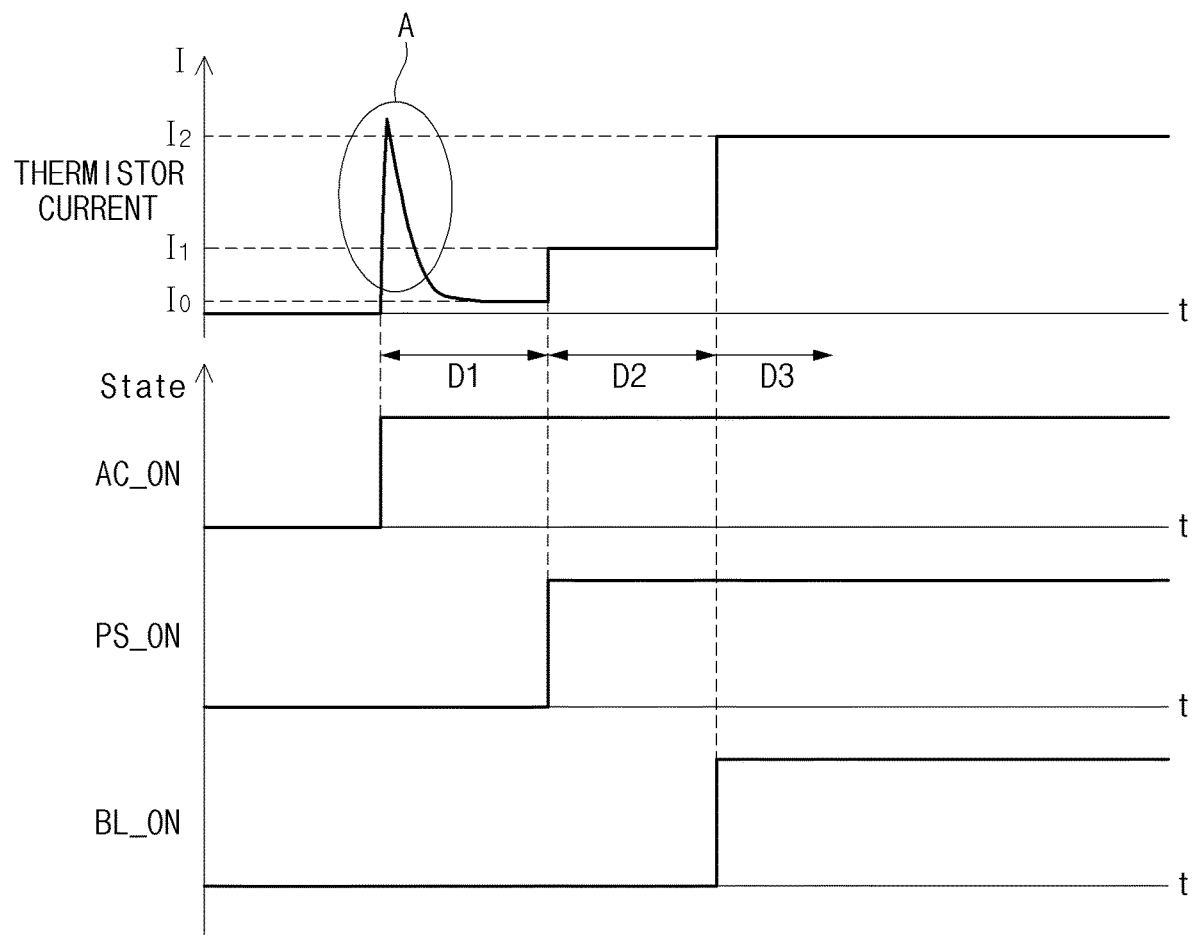
FIG. 3 is a graph for describing first to third modes and a change in a current applied to a thermistor according to an embodiment of the disclosure.

FIG. 3 is a graph for describing first to third modes and a change in a current applied to a thermistor according to an embodiment of the disclosure. In FIG. 3, AC_ON indicates an application state of an AC power, PS_ON indicates an application state of a first signal, and BL_ON indicates an application state of a second signal. Although the current change of the thermistor may change slowly or fluctuate in FIG. 3, FIG. 3 illustrates that the current increases with sharp change (e.g., a step shape) for convenience of description.

Referring to FIG. 3, according to an embodiment, when an input power is supplied, an inrush current A may be applied to the thermistor TH1. The inrush current A may be reduced in magnitude through the thermistor TH1 because the inrush current A is limited by the thermistor TH1. A comparatively small amount of current $I_0$ may flow after the initial inrush current is applied to the thermistor TH1 before the generation of the first signal (during a period D1) (before the power-on is performed) even though the input power is supplied.

According to one embodiment, a relatively smaller amount of current $I_1$ than that after the generation of the second signal (a period D3) may flow through the thermistor TH1 before the generation of the second signal after the generation of the first signal (a period D2) although there are some differences depending on subblocks to be executed.

According to one embodiment, a relatively large amount of current $I_2$ may flow through the thermistor TH1 after the generation of the second signal (the period D3). A description will be given in the disclosure under the assumption that the display device 10 consumes a relatively larger amount of current at the time of activation of the display 140 than that at the time of deactivation of the display 140 although more current may be consumed for a communication function or the like depending on the display device 10.

Figure 4:
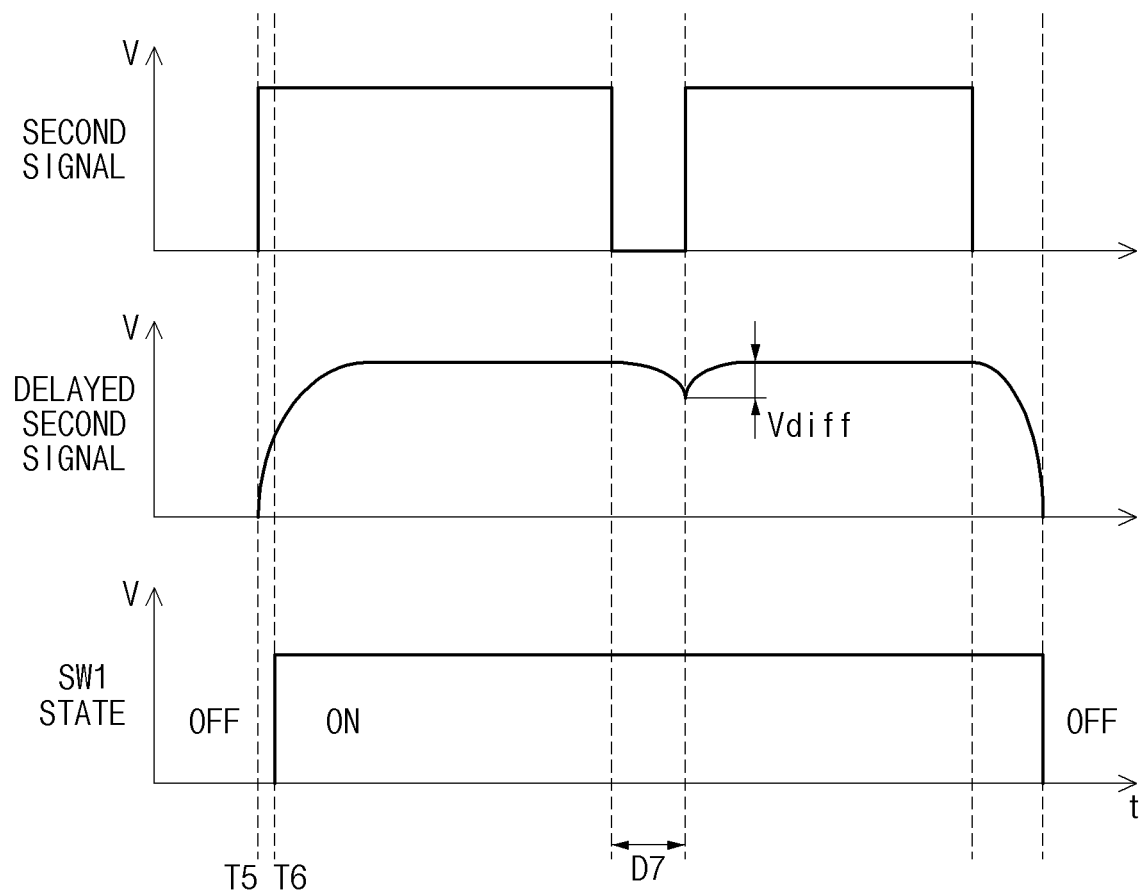
FIG. 4 is a graph for describing a process of canceling two state transitions of a second signal which are made within a threshold time according to an embodiment of the disclosure.

FIG. 4 is a graph for describing a process of canceling two state transitions of a second signal which are made within a threshold time according to an embodiment of the disclosure.

According to one embodiment, because the filter F1 may delay and output the second signal, the first switching unit SW1 receiving the second signal via the filter F1 may receive the second signal from the processor 160 after a certain time (e.g., T6) elapses from a time point (e.g., T5) at which the second signal is output.

As described above, the processor 160 may temporarily change the second signal from the high state to the low state and then again from the low state to the high state to temporarily turn off at least one of the display and the backlight at the time of screen change (e.g., channel change, VOD playback). In this process, to enable a peak-to-peak voltage Vdiff of the two state transitions of the second signal, which are made within the threshold time through time delay, such as the period D7, not to fall below the threshold voltage of the switching circuit SW1 (e.g., the threshold voltage of an FET Q1), the filter F1 may cancel the peak-to-peak voltage Vdiff. For example, when the threshold voltage of the switching circuit SW1 is 0.7V, then the filter F1 may be configured to convert the peak-to-peak voltage of the two state transitions of the second signal made within the threshold time to be less than 0.7V. Therefore, the switching circuit SW1 may not be switched at a time point when two state transitions of the second signal made within the threshold time occur. As described above, in one embodiment, when the display for screen transition is performed or when the backlight is turned off, the contacts of the relay may not move, thereby preventing unnecessary movement and noise of the contacts of the relay.

Figure 5:
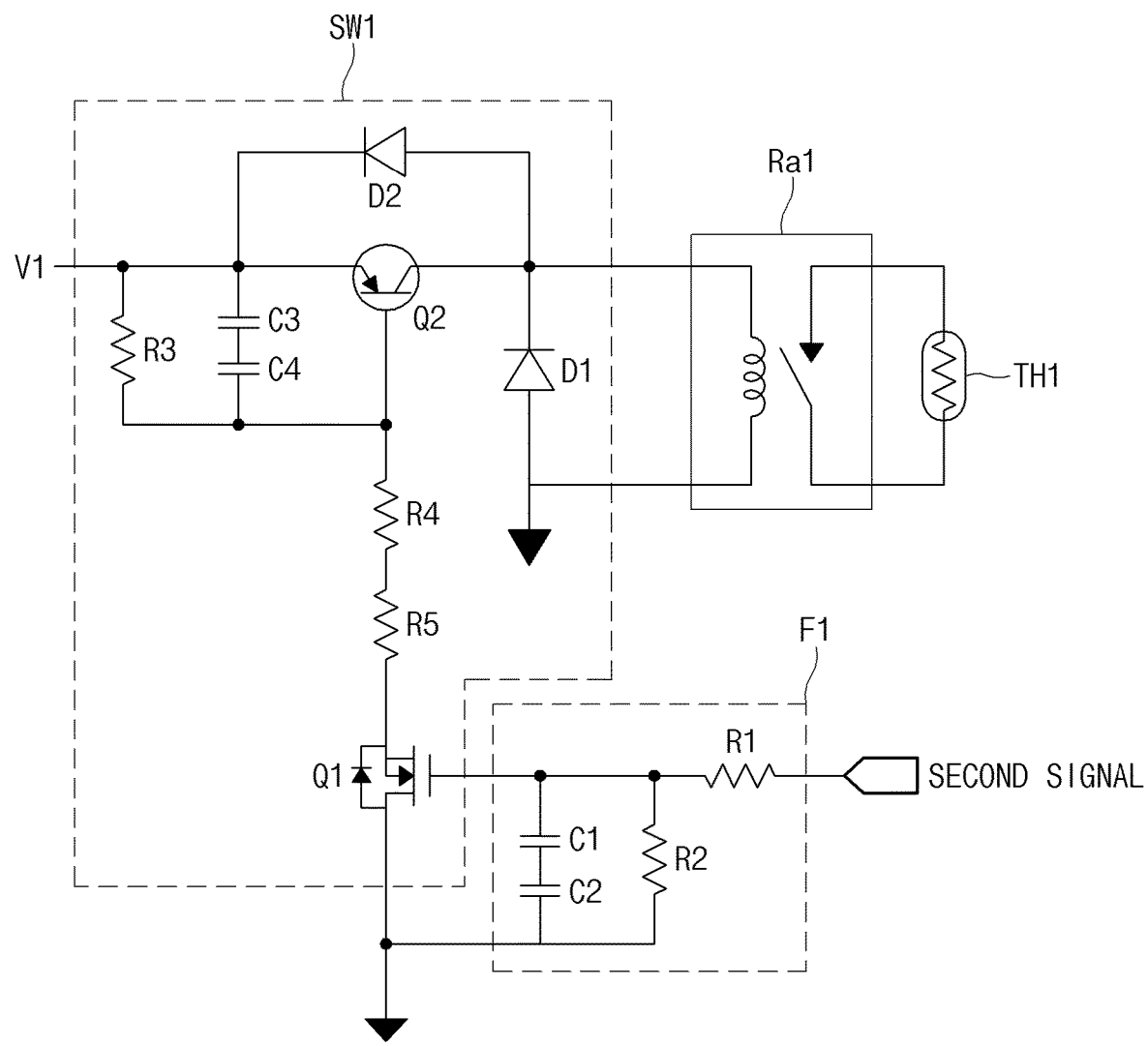
FIG. 5 is a detailed circuit diagram of a stabilization circuit according to one embodiment of the disclosure.

FIG. 5 is a detailed circuit diagram of a stabilization circuit according to one embodiment of the disclosure.

Referring to FIG. 5, according to one embodiment, the stabilization circuit 150 may include the thermistor TH1, the relay Ra1, the filter F1, the switching circuit SW1, and the like.

According to one embodiment, the thermistor TH1 may be provided on the first path through which an AC power is supplied, for example, between the line filter T1 and the rectifying unit U1. The thermistor TH1 may limit an inrush current generated upon the initial application of the AC power. For example, when a resistance of the thermistor TH1 becomes high, the amount of the inrush current may be reduced in proportion to the resistance.

According to one embodiment, the relay Ra1 may provide a second path through which the AC power is supplied to a load without passing through the thermistor TH1. For example, the relay Ra1 may include a switch connected in parallel to the thermistor TH1 and a coil that changes a contact of the switch when a current is supplied. According to a type of the contact, the relay Ra1 may turn on the switch when the current is supplied and turn off the switch when no current is supplied, and turn off the switch when a current is supplied to the coil and turn on the switch when no current is supplied to the coil. The former case is taken as an example for description. When the current is supplied, the relay Ra1 may support the AC power to be transferred to the load via the second path instead of the first path.

According to one embodiment, the filter F1 may delay a second signal when the second signal is applied. According to one embodiment, the filter F1 may cancel two state transitions of the second signal for screen mute as it supports the input signal by a specified time constant. For example, the filter F1 may cancel the state transition of the second signal when the time required for the two state transitions of the second signal is within a threshold time. The threshold time may be determined based on the on/off time of the second signal for screen mute. Because the second signal is a digital signal, the second signal may be in a first state or a second state. For example, when the first state is a high state, the second state is a low state, and when the first state is the low state, the second state may be the high state.

In one embodiment, the filter F1 may be an RC filter including a first resistor R1, a second resistor R2, a first capacitor C1 and a second capacitor C2. The resistances of the first and second resistors R1 and R2 and the capacitances of the first and second capacitors C1 and C2 may be determined to cancel the two state transitions of the second signal for screen mute in the third mode. For example, the resistances of the first and second resistors R1 and R2 and the capacitances of the first and second capacitors C1 and C2 may be set such that a peak-to-peak voltage of the two state transitions of the second signal made within the threshold time is converted within a threshold voltage that is detectable by the switching circuit SW1 (e.g., a first switching unit). For example, when the threshold voltage of the switching circuit SW1 is 0.7V, the resistances and the capacitances may be set such that the peak-to-peak voltage of the two state transitions of the second signal made within the threshold time is converted to be less than 0.7V. Accordingly, in one embodiment, it is possible to avoid the problem that the relay contacts are moved in the case of channel change or the like in the third mode. The filter F1 may be omitted when the delay of the second signal or the like is unnecessary, but the description is given by taking a case where the filter F1 is provided as an example.

According to one embodiment, when the switching circuit SW1 receives the second signal via the filter F1, the switching circuit SW1 may supply a first driving voltage to the coil of the relay Ra1. The switching circuit SW1 may include first and second switching units Q1 and Q2 and peripheral circuits R3 to R5, C3 and C4. The first switching unit Q1 may be turned on or off based on whether the delayed second signal is received. For example, the first switching unit Q1 may be an N-channel FET. The second switching unit Q2 may be turned on or off based on the turn-on state of the first switching unit Q1. For example, the second switching unit Q2 may be a PNP transistor. The peripheral circuits R3, R4, R5, C3, C4, D1, and D2 may support turning-on and turning-off of the second switching unit Q2. The peripheral circuits R3 to R5, C3, C4, D1 and D2 may include at least one resistor R3, R4 or R5, at least one capacitor C3 or C4 and at least one diode D1 or D2. In one embodiment, an input power may be stably isolated from the second signal by using the plurality of switching units Q1 and Q2. Detailed components of the switching circuit SW1 will be described below.

In one embodiment, both ends of the third resistor R3 may be connected between the emitter and the base of the transistor Q2 and one end of the fourth resistor R4 may be connected to the base of the transistor Q2, the other end of the fifth resistor R5 may be connected to the drain of the FET Q1, and the other end of the fourth resistor R4 and one end of the fifth resistor R5 may be connected in series. The fourth and fifth resistors R4 and R5 may be integrated into one, or may be composed of three or more. The third to fifth resistors R3 to R5 may divide the first driving voltage V1 when the first switching unit Q1 is turned on, allowing a potential of the base of the transistor Q2 to be equal to or lower than the threshold voltage of the transistor Q2. The at least one capacitor C3 or C4 may prevent the second switching unit Q2 from being turned on due to introduction of noise when the transistor Q2 is turned off. The first and second diodes D1 and D2 may provide a discharge path of a current which has passed through the relay Ra1 when the relay Ra1 is turned on.

In one embodiment, the gate of the FET Q1 may be connected to the supply path of the delayed second signal, the drain of the FET Q1 may be connected to the other end of the fifth resistor R5, and the source of the FET Q1 may be connected to ground. Thus, the FET Q1 may be turned on in a high period of the delayed second signal.

In one embodiment, the emitter of the transistor Q2 may be connected to a supply path of the first driving voltage V1, the base of the transistor Q2 may be connected to the FET Q1 through the fourth and fifth resistors R4 and R5, and the collector of the transistor Q2 may be connected to the coil of the relay Ra1.

In one embodiment, the first driving voltage V1 is applied to the base of the transistor Q2 by the third resistor R3 when the first switching unit Q1 is turned off because the second signal is not applied. (i.e., a voltage exceeding the threshold voltage is applied). Thus, the transistor Q2 may not be turned on at the time when the FET Q1 is turned off. Then, the relay Ra1 may be turned off not to provide the second path, and therefore, the input power may be supplied to the load via the thermistor TH1.

On the other hand, when the second signal is applied and the first switching unit Q1 is turned on, the potential of the base of the transistor Q2 may be equal to or lower than the threshold voltage by the voltage division of the third to fifth resistors R3 to R5. Then, the relay Ra1 may be turned on by receiving the first driving voltage V1 through the transistor Q2 to support the input power to be supplied to the load through the second path.

Although the switching circuit SW1 is described as being configured by a combination of the N-channel FET and the PNP transistor in the one embodiment, the disclosure is not limited thereto. For example, the switching circuit SW1 may be implemented in other forms to supply power to the coil in the low active period of the second signal when the second signal is a low active signal. As another example, the switching circuit SW1 may be composed of a combination of two FETs or transistors, and may be configured to use a P-channel FET or an NPN transistor.

Figure 6:
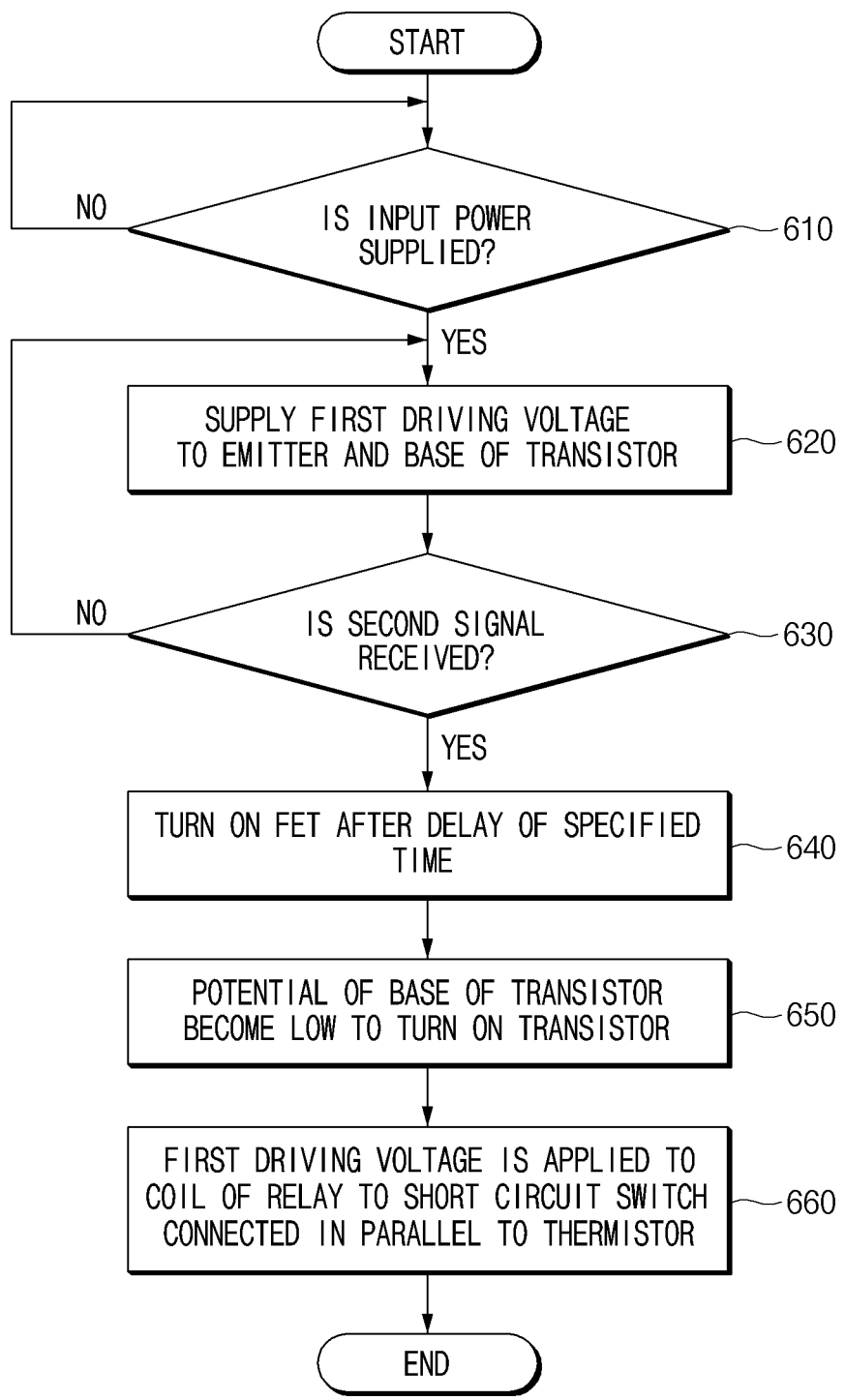
FIG. 6 is a flowchart illustrating a relay-on sequence according to an embodiment of the disclosure.

FIG. 6 is a flowchart illustrating a relay-on sequence according to an embodiment of the disclosure. The relay-on sequence upon power-on of a display module to which the stabilization circuit of FIG. 5 is applied will be described with reference to FIG. 6.

Referring to FIG. 6, in operation 610, when an input power is supplied to the power supply module 110, the power supply module 110 may output a first driving voltage.

In operation 620, the first driving voltage may be applied to the emitter and base of the transistor Q2.

In operation 630, when the processor 160 outputs a second signal for activating at least one of a display and a backlight, the filter F1 of the stabilization circuit 150 may receive the second signal.

In operation 640, the filter F1 may delay the second signal and the FET Q1 may be turned on in the high period of the delayed second signal.

In operation 650, when the FET Q1 is turned on, a potential of the base of the transistor Q2 may become low due to the voltage division by the third to fifth resistors R3 to R5, to turn on the transistor Q2.

In operation 660, when the transistor Q2 is turned on, the first driving voltage is applied to the coil of the relay Ra1, so that the switch of the relay Ra1 connected in parallel to the thermistor TH1 may be short-circuited.

Figure 7:
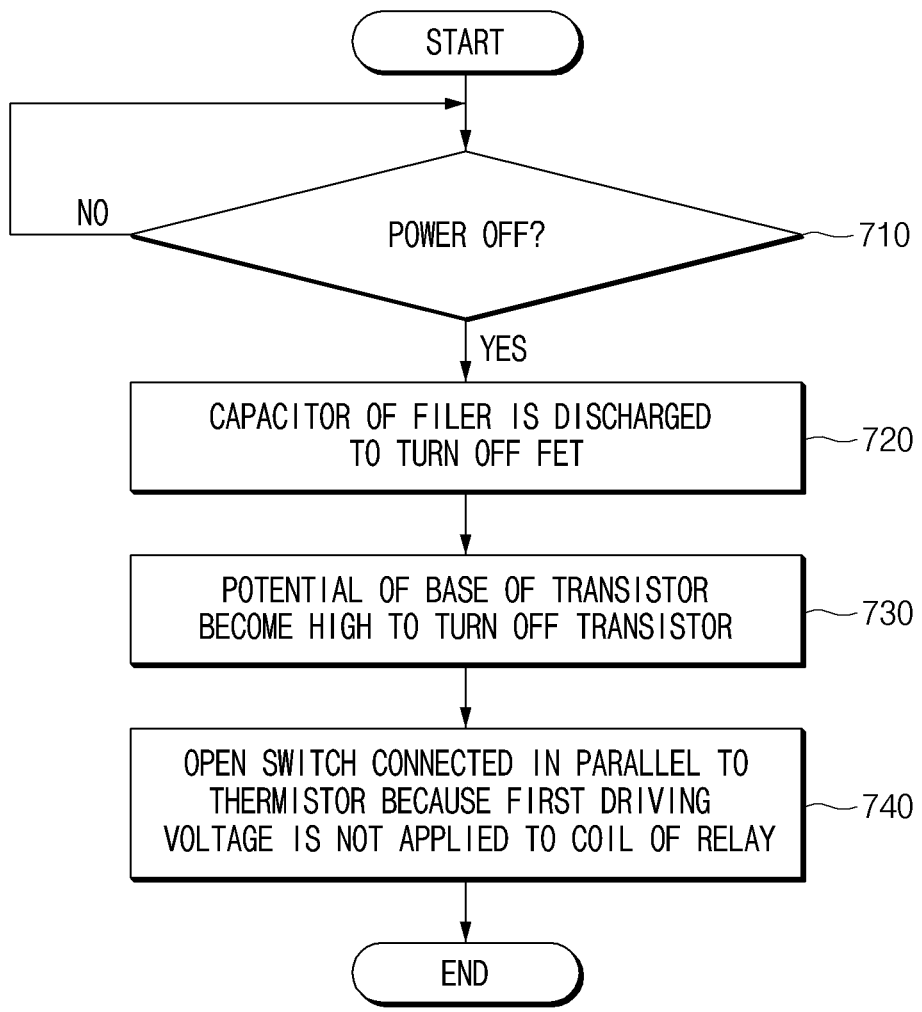
FIG. 7 is a flowchart of a relay-off sequence according to one embodiment of the disclosure

FIG. 7 is a flowchart of a relay-off sequence according to one embodiment of the disclosure. FIG. 7 illustrates a relay-off sequence at the time of power-off of a display module to which the stabilization circuit of FIG. 5 is applied.

In operation 710, if the processor 160 is powered off, the filter F1 may not receive the second signal. For example, the input of the filter F1 may be in a low state.

In operation 720, when the input of the filter F1 is in the low state, the first and second capacitors C1 and C2 may be discharged and the FET Q1 may be turned off.

In operation 730, when the FET Q1 is turned off, the potential of the base of the transistor Q2 may become high (the first operation power is acquired), and the transistor Q2 may be turned off.

In operation 740, when transistor Q2 is turned off, the first driving voltage V1 may not be applied to the coil of relay Ra1, so that the switch of relay Ra1, which is connected in parallel to thermistor TH1, may be opened.

Figure 8:
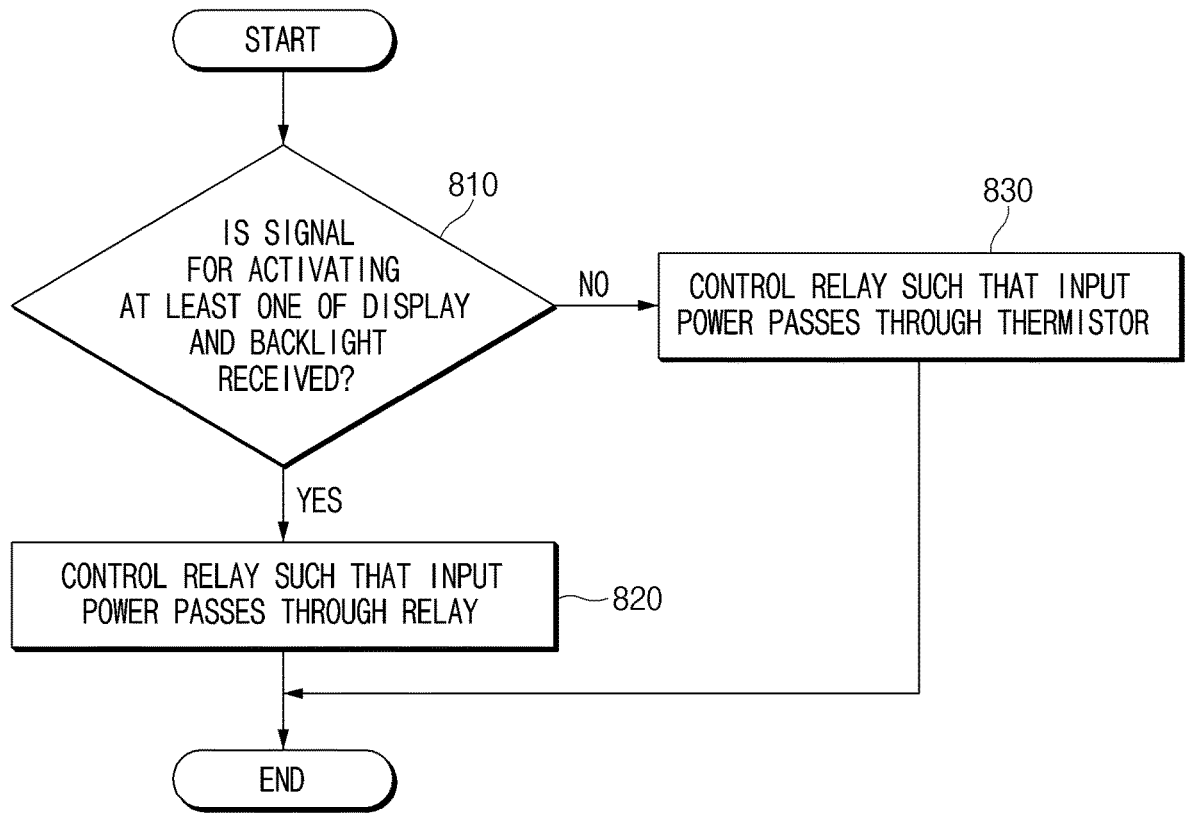
FIG. 8 is a flowchart of a power stabilization method according to an embodiment of the disclosure.

FIG. 8 is a flowchart of a power stabilization method according to an embodiment of the disclosure.

Referring to FIG. 8, in operation 810, the stabilization circuit 150 may determine whether a second signal for activating at least one of a display and a backlight is received.

In operation 820, the stabilization circuit 150 may control the relay Ra1 such that an input power passes through the relay Ra1 without passing through the thermistor TH1 when the second signal is received. The second signal may be a signal for activating at least one of the display and the backlight.

In operation 830, the stabilization circuit 150 may control the relay Ra1 such that the input power passes through the thermistor TH1 before reception of the second signal.

In one embodiment, the number of movements of relay contacts unnecessary compared to the conventional display device may be reduced by synchronizing the contacts of the relay to the activation timing of the display.

According to an embodiment, a power stabilization circuit (e.g., 150 in FIG. 2) may include a thermistor (e.g., TH1 in FIG. 2) provided on a first path through which an input power is supplied, to limit an inrush current of the power, a relay (e.g., Ra1 in FIG. 2) that provides a second path through which the power is supplied without passing through the thermistor, to allow the power to be transferred through the second path instead of the first path when a current is supplied, and a switching circuit (e.g., SW1 in FIG. 2) that is switched to supply the current generated from the input power to the relay when an activation signal for activating at least one of a display (e.g., 140 in FIG. 2) and a backlight (e.g., 145 in FIG. 2) of the display is received.

The activation signal may be in a first state or a second state, when the first state is a high state, the second state may be a low state, when the first state is the low state, the second state may be the high state, the power stabilization circuit may further include a filter (e.g., F1 in FIG. 2) configured to cancel a state transition of the activation signal when a time required for the two state transitions in which the activation signal transitions from the first state to the second state and then from the second state to the first state is within a threshold time, and the switching circuit may receive the activation signal passed through the filter.

The filter may include an RC filter (e.g., F1 in FIG. 5) including a combination of at least one resistor and at least one capacitor for delaying the activation signal.

A resistance of the resistor and the capacitance of the capacitor may be set such that a peak to peak voltage of the two state transitions made within the threshold time is converted to be less than a threshold voltage for switching of the switching circuit.

The relay (e.g., Ra1 in FIG. 5) may include a switch and a coil, the switch may be connected in parallel to the thermistor (e.g., TH1 in FIG. 5), the coil may short-circuit or open the switch according to whether the current is supplied, and the switching circuit may supply a current to the coil such that the switch is short-circuited when the activation signal is received.

The switching circuit may include a first transistor (e.g., Q1 in FIG. 5) that is turned on or off based on whether the activation signal is received, a second transistor (e.g., Q2 in FIG. 5) that is turned on or off based on a turn-on state of the first transistor.

The first transistor may be an FET that is turned on when receiving the activation signal, and the second transistor may be a transistor that supplies a driving voltage generated from the input power to the relay when the first transistor is turned on.

The switching circuit may further include at least one first resistor and at least one second resistor, the first transistor may be an N-channel FET (e.g., Q1 in FIG. 5), the second transistor may be a PNP transistor (e.g., Q2 in FIG. 5), both ends of the at least one first resistor (e.g., R3 in FIG. 5) may be connected between an emitter and a base of the PNP transistor, both ends of the at least one second resistor (e.g., R4 in FIG. 5) may be connected to the base of the PNP transistor and a drain of the N-channel FET, the emitter of the PNP transistor may be connected to a supply path of the driving voltage, the base of the PNP transistor may be connected to the drain of the N-channel FET through the second resistor, and a collector of the PNP transistor may be connected to the coil of the relay, a gate of the N-channel FET may be connected to a supply path of the activation signal, a source of the N-channel FET may be connected to ground, and the drain of the N-channel FET may be connected to the base of the PNP transistor through the second resistor.

The at least one capacitor and the at least one first resistor may be connected in parallel to each other between the emitter and the base of the PNP transistor.

When the activation signal is in the high state, the N-channel FET may be turned on, and when the N-channel FET is turned on, the driving voltage may be divided by the at least one first resistor and the at least one second resistor to allow a potential of the base to be equal to or lower than a threshold voltage of the PNP transistor, the PNP transistor may be turned on and the current may be supplied to the relay.

When the activation signal is in the low state, the N-channel FET may be turned off, and when the N-channel FET is turned off, the driving voltage may be applied across the at least one first resistor to allow a potential of the base of the PNP transistor to be higher than a threshold voltage of the PNP transistor, the PNP transistor may be turned off and the current is not supplied to the relay.

According to an embodiment, a display device (e.g., 10 in FIG. 1) may include a power stabilization circuit (e.g., 150 in FIG. 2), and further include at least one of the display and the backlight of the display activated by the activation signal, The power stabilization circuit may further include a converting unit (e.g., U2 of FIG. 2) that outputs a driving voltage of at least one of the display and the backlight of the display when receiving the activation signal, and at least one of the display and the backlight may be activated using the driving voltage (e.g., V1 of FIG. 2).

According to an embodiment, a power stabilization method may include limiting an inrush current of an input power through a thermistor provided on a first path through which the input power is supplied, switching a switching circuit to output a first driving voltage generated from the input power when an activation signal for activating at least one of a display and a backlight of the display is received, and supplying the first driving voltage transferred through the switching circuit to a relay providing a second path on which the input power does not pass through the thermistor to allow the input power to be supplied through the second path.

The outputting of the first driving voltage may include canceling a state transition of the activation signal when a time required for the two state transitions in which the activation signal transitions from the first state to the second state and then from the second state to the first state is within a threshold time.

The limiting of the inrush current may further include generating the first driving voltage regardless of reception of the first activation signal when the input power is supplied.

According to an embodiment, the power stabilization method may further include receiving a second activation signal which is transmitted when a booting block driven by the first driving voltage detects a scheduled or requested time point, outputting a second driving voltage when the second activation signal is received and receiving the first activation signal from a processor booted using the second driving voltage.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an inner memory, or the like. The instruction may contain a code made by a compiler or a code executable by an interpreter. A module or a program module according to various embodiments may include at least one of the above components, or a part of the above components may be omitted, or additional other components may be further included.

Operations performed by a module, a program module, or other components according to various embodiments may be executed sequentially, in parallel, repeatedly, or in a heuristic method. In addition, some operations may be executed in different sequences or may be omitted. Alternatively, other operations may be added. The embodiments disclosed herein are presented for the purpose of explanation and understanding of the disclosed technology and do not limit the scope of the technology described in the disclosure. Accordingly, the scope of the disclosure should be interpreted to include all modifications based on the technical idea of the disclosure or various other embodiments.

According to embodiments disclosed herein, it is possible to improve a user's discomfort due to the emotional noise of the relay.

What is claimed is:

1. A power stabilization circuit comprising:
   a thermistor provided on a first path through which an input power is supplied, to limit an inrush current of the power;
   a relay configured to provide a second path through which the power is supplied without passing through the thermistor, to allow the power to be transferred through the second path instead of the first path when a current is supplied;
   a switching circuit configured to be switched based on an activation signal for activating at least one of a display and a backlight of the display to supply the current generated from the input power to the relay; and
   a filter circuit,
   wherein the activation signal is in a first state or a second state,
   wherein when the first state is a high state, the second state is a low state,
   wherein when the first state is the low state, the second state is the high state,
   wherein the filter circuit is configured to cancel two state transitions of the activation signal when a time required for the two state transitions in which the activation signal transitions from the first state to the second state and then from the second state to the first state, is within a threshold time, and
   wherein the switching circuit receives the activation signal passed through the filter circuit.

2. The power stabilization circuit of claim 1, wherein the filter circuit includes an RC filter circuit including a combination of at least one resistor and at least one capacitor for delaying the activation signal.

3. The power stabilization circuit of claim 2, wherein a resistance of the resistor and a capacitance of the capacitor are set such that a peak to peak voltage of the two state transitions made within the threshold time is converted to be less than a threshold voltage for switching of the switching circuit.

4. The power stabilization circuit of claim 1, wherein the relay includes a switch and a coil,
   wherein the switch is connected in parallel to the thermistor,
   wherein the coil short-circuits or opens the switch based on the supply of the current, and
   wherein the switching circuit supplies a current to the coil based on the activation signal such that the switch is short-circuited.

5. The power stabilization circuit of claim 1, wherein the switching circuit includes:
   a first transistor configured to be turned on or off based on the activation signal; and
   a second transistor configured to be turned on or off based on a state of the first transistor.

6. The power stabilization circuit of claim 5, wherein the first transistor is a Field Effect Transistor (FET) configured to be turned on when receiving the activation signal, and
   wherein the second transistor is a transistor configured to supply a driving voltage generated from the input power to the relay when the first transistor is turned on.

7. The power stabilization circuit of claim 6, wherein the switching circuit further includes at least one first resistor and at least one second resistor,
   wherein the first transistor is an N-channel FET, the second transistor is a PNP transistor,
   wherein both ends of the at least one first resistor are connected between an emitter of the PNP transistor and a base of the PNP transistor and both ends of the at least one second resistor are connected to the base of the PNP transistor and a drain of the N-channel FET,
   wherein the emitter of the PNP transistor is connected to a supply path of the driving voltage, the base of the PNP transistor is connected to the drain of the N-channel FET through the at least one second resistor, and a collector of the PNP transistor is connected to a coil of the relay, and
   wherein a gate of the N-channel FET is connected to a supply path of the activation signal, a source of the N-channel FET is connected to ground, and the drain of the N-channel FET is connected to the base of the PNP transistor through the at least one second resistor.

8. The power stabilization circuit of claim 7, wherein the at least one capacitor and the at least one first resistor are connected in parallel to each other between the emitter of the PNP transistor and the base of the PNP transistor.

9. The power stabilization circuit of claim 7, wherein when the activation signal is in the high state, the N-channel FET is turned on, and
   wherein when the N-channel FET is turned on, the driving voltage is divided by the at least one first resistor and the at least one second resistor to allow a potential of the base of the PNP transistor to be equal to or lower than a threshold voltage of the PNP transistor, the PNP transistor is turned on, and the current is supplied to the relay.

10. The power stabilization circuit of claim 7, wherein when the activation signal is in the low state, the N-channel FET is turned off, and
wherein when the N-channel FET is turned off, the driving voltage is divided by the at least one first resistor to allow a potential of the base of the PNP transistor to be higher than a threshold voltage of the PNP transistor, the PNP transistor is turned off, and the current is not supplied to the relay.

11. A display device comprising:
the power stabilization circuit of claim 1,
further comprising:
at least one of the display and the backlight of the display activated by the activation signal.

12. The display device of claim 11, further comprising:
a converting unit configured to output a driving voltage of at least one of the display and the backlight of the display based on the activation signal,
wherein at least one of the display and the backlight is activated using the driving voltage.

13. A power stabilization method, comprising:
limiting an inrush current of an input power through a thermistor provided on a first path through which the input power is supplied;
switching a switching circuit to output a first driving voltage generated from the input power based on an activation signal for activating at least one of a display and a backlight of the display; and
supplying the first driving voltage transferred through the switching circuit to a relay providing a second path on which the input power does not pass through the thermistor to allow the input power to be supplied through the second path,
wherein the outputting of the first driving voltage includes canceling two state transitions of the activation signal when a time required for the two state transitions in which the activation signal transitions from a first state to a second state and then from the second state to the first state, is within a threshold time.

* * * * *